(12) United States Patent
Feng et al.

(10) Patent No.: US 11,087,371 B2
(45) Date of Patent: Aug. 10, 2021

(54) BLOCKCHAIN-BASED INVOICE CREATION METHOD APPARATUS, AND ELECTRONIC DEVICE

(71) Applicant: Advanced New Technologies Co., Ltd., Grand Cayman (KY)

(72) Inventors: Zhaolin Feng, Hangzhou (CN); Xu Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,653

(22) Filed: Mar. 5, 2020

(65) Prior Publication Data

US 2020/0202396 A1  Jun. 25, 2020

Related U.S. Application Data

(63) Continuation of application No. PCT/CN2020/070600, filed on Jan. 7, 2020.

(30) Foreign Application Priority Data

Apr. 29, 2019 (CN) .......................... 201910356848.0

(51) Int. Cl.
*G06Q 30/00* (2012.01)
*G06Q 30/04* (2012.01)
(Continued)

(52) U.S. Cl.
CPC .......... *G06Q 30/04* (2013.01); *G06Q 20/405* (2013.01); *G06Q 40/123* (2013.12); *H04L 9/0637* (2013.01)

(58) Field of Classification Search
CPC .................................................... G06Q 30/04
(Continued)

(56) References Cited

U.S. PATENT DOCUMENTS

2009/0132414 A1* 5/2009 Philliou ............... G06Q 20/102
705/40
2020/0104587 A1* 4/2020 Bhatnagar ............. G06F 40/216

FOREIGN PATENT DOCUMENTS

CN 107133831 9/2017
CN 108122139 6/2018
(Continued)

OTHER PUBLICATIONS

ProQuest Search History.*
(Continued)

*Primary Examiner* — John H. Holly
(74) *Attorney, Agent, or Firm* — Fish & Richardson P.C.

(57) ABSTRACT

Computer-implemented methods, non-transitory, computer-readable media, and computer-implemented systems for creating blockchain-based invoices are provided. In a computer-implemented method, an invoice creation transaction for a target payment order is received by a node device in a tax blockchain. The invoice creation transaction includes an identifier of a first collection confirmation transaction whose certificate has been stored in the tax blockchain. The first collection confirmation transaction includes an identifier of a second collection confirmation transaction whose certificate has been stored in a payment blockchain. The first and second collection confirmation transaction are identified based on the identifiers of the first and second collection confirmation transaction, respectively. In response to detecting that collection confirmation data in the first collection confirmation transaction matches collection confirmation data in the second collection confirmation transaction, invoice creation logic declared in a predetermined smart contract is invoked to create an invoice for the target payment order.

20 Claims, 4 Drawing Sheets

(51) Int. Cl.
*G06Q 40/00* (2012.01)
*G06Q 20/40* (2012.01)
*H04L 9/06* (2006.01)

(58) Field of Classification Search
USPC ...................................... 705/40, 1.1, 35, 42
See application file for complete search history.

(56) References Cited

FOREIGN PATENT DOCUMENTS

| CN | 108734528 | 11/2018 |
|---|---|---|
| CN | 108921559 | 11/2018 |
| CN | 108921628 | 11/2018 |
| CN | 108961030 | 12/2018 |
| CN | 109087204 | 12/2018 |
| CN | 109326043 | 2/2019 |
| CN | 109598147 | 4/2019 |
| CN | 109600433 | 4/2019 |
| CN | 109615383 | 4/2019 |
| CN | 109636402 | 4/2019 |
| CN | 109636492 | 4/2019 |
| CN | 110163691 | 8/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/070600, dated Apr. 8, 2020, 21 pages (with machine translation).

Tencent.com [online], "The Country's First Blockchain Electronic Invoice Issued by Shenzhen—Tencent Blockchain Adds Another Application Scenario," Aug. 2018, retrieved on Apr. 8, 2020, retrieved from URL<https://cloud.tencent.com/developer/article/1183062>, 19 pages (with machine translation).

* cited by examiner

US 11,087,371 B2

BLOCKCHAIN-BASED INVOICE CREATION METHOD APPARATUS, AND ELECTRONIC DEVICE

CROSS-REFERENCE TO RELATED APPLICATIONS

This application is a continuation of PCT Application No. PCT/CN2020/070600, filed on Jan. 7, 2020, which claims priority to Chinese Patent Application No. 201910356848.0, filed on Apr. 29, 2019, and each application is hereby incorporated by reference in its entirety.

TECHNICAL FIELD

One or more implementations of the present specification relate to the field of blockchain technologies, and in particular, to blockchain-based invoice creation methods, apparatuses, and electronic devices.

BACKGROUND

The blockchain technology, also referred to as a distributed ledger technology, is an emerging technology in which several computing devices jointly participate in "accounting" and jointly maintain a complete distributed database. Due to its features of decentralization, openness and transparency, participation in database recording by each computing device, and fast data synchronization between computing devices, the blockchain technology has been widely used in many fields.

SUMMARY

The present specification provides a blockchain-based invoice creation method, where the method is applied to a node device in a tax blockchain, and there is a cross-chain reference relationship between the tax blockchain and a payment blockchain; and the method includes the following: receiving an invoice creation transaction for a target payment order, where the invoice creation transaction includes an identifier of a first collection confirmation transaction whose certificate has been stored in the tax blockchain by a payment institution, and the first collection confirmation transaction includes an identifier of a second collection confirmation transaction whose certificate has been stored in the payment blockchain by the payment institution; identifying the first collection confirmation transaction in the tax blockchain based on the identifier of the first collection confirmation transaction, and identifying the second collection confirmation transaction in the payment blockchain based on the identifier of the second collection confirmation transaction; detecting whether collection confirmation data in the first collection confirmation transaction matches collection confirmation data in the second collection confirmation transaction; and if the collection confirmation data in the first collection confirmation transaction matches the collection confirmation data in the second collection confirmation transaction, invoking invoice creation logic declared in a predetermined smart contract to create an invoice for the target payment order.

Optionally, the receiving an invoice creation transaction for a target payment order includes the following: receiving an invoice creation request for the target payment order initiated by a user; or generating the invoice creation transaction based on the identifier of the second collection confirmation transaction when the second collection confirmation transaction whose certificate has been stored in the tax blockchain is detected.

Optionally, the smart contract further declares data matching logic, and the detecting whether collection confirmation data in the first collection confirmation transaction matches collection confirmation data in the second collection confirmation transaction includes the following: invoking the data matching logic declared in the smart contract to detect whether the collection confirmation data in the first collection confirmation transaction matches the collection confirmation data in the second collection confirmation transaction.

Optionally, the second collection confirmation transaction includes an identifier of original order data whose certificate has been stored in the payment blockchain and that corresponds to the target payment order; and before the invoking invoice creation logic declared in a predetermined smart contract to create an invoice for the target payment order, the method further includes the following: identifying the original order data in the payment blockchain based on the identifier of the original order data; detecting whether the original order data is complete; and if the original order data is complete, further invoking the invoice creation logic declared in the predetermined smart contract to create the invoice for the target payment order.

Optionally, the original order data is published to the payment blockchain for certificate storage in the form of a linked list, and the identifier of the original order data is a hash pointer corresponding to the last node of the linked list.

Optionally, the original order data includes a three-party contract signing result, order creation data, and order payment data, where the order creation data is linked to the three-party contract signing result by using a hash pointer corresponding to the three-party contract signing result; and the order payment data is linked to the order creation data by using a hash pointer corresponding to the order creation data, and the order payment data is the last node of the one-way linked list.

Optionally, the method further includes the following: when it is determined that the creation of the invoice for the target payment order is completed, publishing invoice data and the identifier of the first collection confirmation transaction to the tax blockchain for certificate storage.

Optionally, the method further includes the following: when a reimbursement approval result from a reimbursement institution is received, publishing the reimbursement approval result and an identifier of the invoice data to the tax blockchain for certificate storage.

The present specification further provides a blockchain-based invoice creation apparatus, where the apparatus is applied to a node device in a tax blockchain, and there is a cross-chain reference relationship between the tax blockchain and a payment blockchain; and the apparatus includes the following: a receiving module, configured to receive an invoice creation transaction for a target payment order, where the invoice creation transaction includes an identifier of a first collection confirmation transaction whose certificate has been stored in the tax blockchain by a payment institution, and the first collection confirmation transaction includes an identifier of a second collection confirmation transaction whose certificate has been stored in the payment blockchain by the payment institution; a first query module, configured to identify the first collection confirmation transaction in the tax blockchain based on the identifier of the first collection confirmation transaction, and identify the second collection confirmation transaction in the payment blockchain based on the identifier of the second collection confirmation transaction; a first detection module, configured to detect whether collection confirmation data in the first collection confirmation transaction matches collection confirmation data in the second collection confirmation transaction; and an invoice creation module, configured to: if the collection confirmation data in the first collection confirmation transaction matches the collection confirmation data in the second collection confirmation transaction, invoke invoice creation logic declared in a predetermined smart contract to create an invoice for the target payment order.

Optionally, the receiving module is configured to: receive an invoice creation request for the target payment order initiated by a user; or generate the invoice creation transaction based on the identifier of the second collection confirmation transaction when the second collection confirmation transaction whose certificate has been stored in the tax blockchain is detected.

Optionally, the smart contract further declares data matching logic, and the first detection module is configured to: invoke the data matching logic declared in the smart contract to detect whether the collection confirmation data in the first collection confirmation transaction matches the collection confirmation data in the second collection confirmation transaction.

Optionally, the second collection confirmation transaction includes an identifier of original order data whose certificate has been stored in the payment blockchain and that corresponds to the target payment order; and the apparatus further includes the following: a second query module, configured to: before the invoice creation logic declared in the predetermined smart contract is invoked to create the invoice for the target payment order, identify the original order data in the payment blockchain based on the identifier of the original order data; and a second detection module, configured to detect whether the original order data is complete; and the invoice creation module is configured to: if the original order data is complete, further invoke the invoice creation logic declared in the predetermined smart contract to create the invoice for the target payment order.

Optionally, the original order data is published to the payment blockchain for certificate storage in the form of a linked list, and the identifier of the original order data is a hash pointer corresponding to the last node of the linked list.

Optionally, the original order data includes a three-party contract signing result, order creation data, and order payment data, where the order creation data is linked to the three-party contract signing result by using a hash pointer corresponding to the three-party contract signing result; and the order payment data is linked to the order creation data by using a hash pointer corresponding to the order creation data, and the order payment data is the last node of the one-way linked list.

Optionally, the apparatus further includes the following: a first certificate storage module, configured to: when it is determined that the creation of the invoice for the target payment order is completed, publish invoice data and the identifier of the first collection confirmation transaction to the tax blockchain for certificate storage.

Optionally, the apparatus further includes the following: a second certificate storage module, configured to: when a reimbursement approval result from a reimbursement institution is received, publish the reimbursement approval result and an identifier of the invoice data to the tax blockchain for certificate storage.

The present specification further provides an electronic device, including the following: a processor; and a memory, configured to store a machine executable instruction, where by reading and executing a machine executable instruction that is stored in the memory and corresponds to control logic of blockchain-based invoice creation, the processor is enabled to perform the following operations: receiving an invoice creation transaction for a target payment order, where the invoice creation transaction includes an identifier of a first collection confirmation transaction whose certificate has been stored in a tax blockchain by a payment institution, and the first collection confirmation transaction includes an identifier of a second collection confirmation transaction whose certificate has been stored in a payment blockchain by the payment institution; identifying the first collection confirmation transaction in the tax blockchain based on the identifier of the first collection confirmation transaction, and identifying the second collection confirmation transaction in the payment blockchain based on the identifier of the second collection confirmation transaction; detecting whether collection confirmation data in the first collection confirmation transaction matches collection confirmation data in the second collection confirmation transaction; and if the collection confirmation data in the first collection confirmation transaction matches the collection confirmation data in the second collection confirmation transaction, invoking invoice creation logic declared in a predetermined smart contract to create an invoice for the target payment order, where there is a cross-chain reference relationship between the tax blockchain and the payment blockchain.

In the previous technical solution, when the invoice creation transaction for the target payment order is received, the first collection confirmation transaction whose certificate has been stored in the tax blockchain and the second collection confirmation transaction whose certificate has been stored in the payment blockchain can be identified based on the identifier in the invoice creation transaction. In addition, when the collection confirmation data in the first collection confirmation transaction matches the collection confirmation data in the second collection confirmation transaction, the invoice can be created for the target payment order. As such, because the whole invoice creation process can be completed on the payment blockchain and the tax blockchain that have a cross-chain reference relationship, authenticity and reliability of the invoice can be ensured, and the invoice cannot be tampered with.

DESCRIPTION OF IMPLEMENTATIONS

Figure 1:
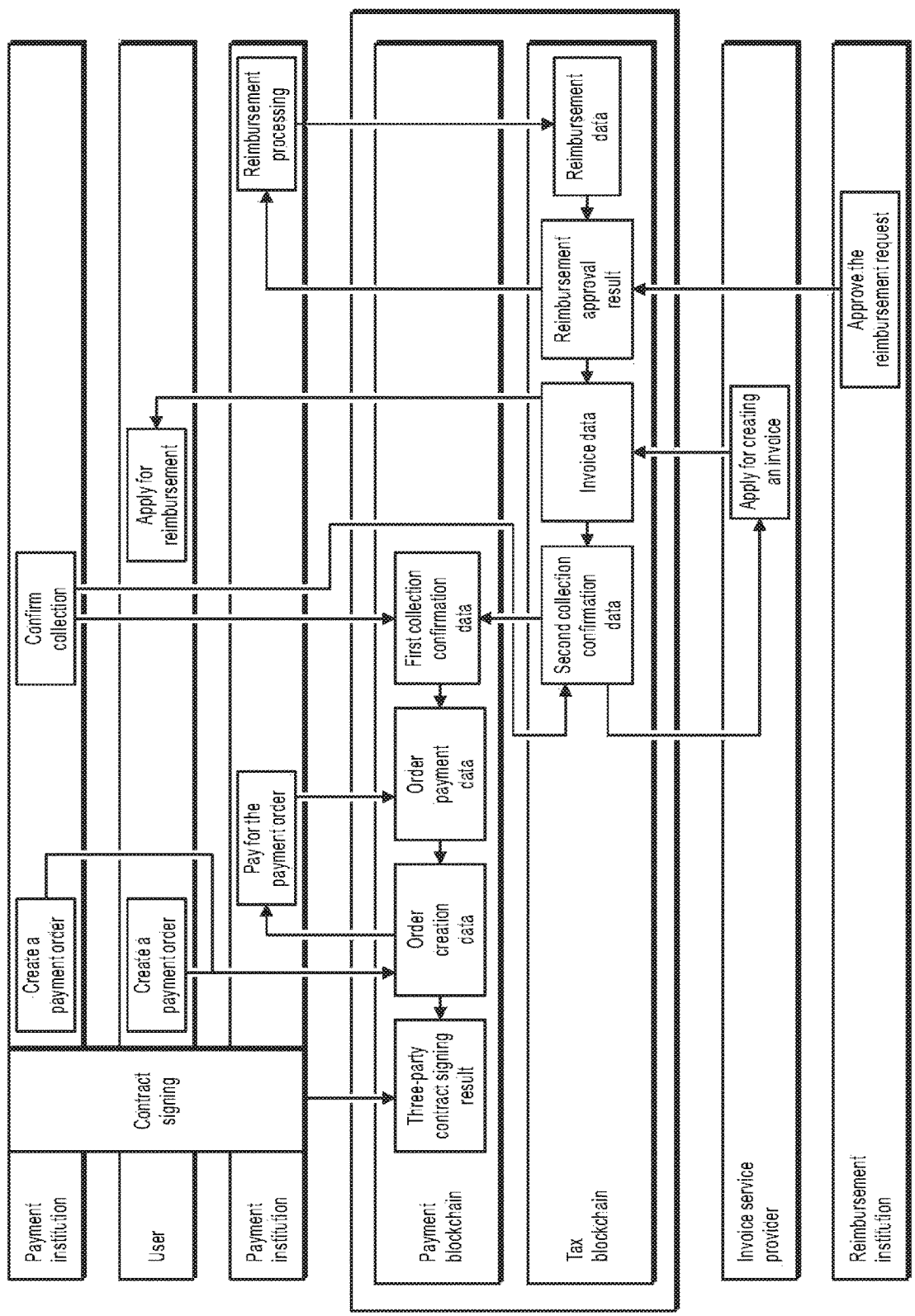
FIG. 1 is a schematic diagram illustrating a blockchain-based invoice creation system, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with one or more implementations of the present specification. On the contrary, the implementations are only examples of apparatuses and methods that are described in the appended claims in detail and consistent with some aspects of one or more implementations of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information should not be limited by these terms. These terms are only used to differentiate between information of the same type. For example, without departing from the scope of the present specification, first information can also be referred to as second information, and similarly, the second information can also be referred to as the first information. Depending on the context, for example, the word "if" used here can be explained as "while", "when", or "in response to determining".

The present specification is intended to provide a technical solution in which when collection confirmation data whose certificate has been stored in the tax blockchain matches collection confirmation data whose certificate has been stored in the payment blockchain, an invoice is created for a payment order corresponding to the collection confirmation data. There is a cross-chain reference relationship between the tax blockchain and the payment blockchain.

During specific implementation, a node device in the tax blockchain can receive an invoice creation transaction for a target payment order, and identify, in the tax blockchain based on an identifier in the invoice creation transaction, a first collection confirmation transaction whose certificate has been stored in the tax blockchain by a payment institution.

Further, the node device can identify, in the payment blockchain based on an identifier in the first collection confirmation transaction, a second collection confirmation transaction whose certificate has been stored in the payment blockchain by the payment institution.

Later, when detecting that collection confirmation data in the first collection confirmation transaction matches collection confirmation data in the second collection confirmation transaction, the node device can invoke invoice creation logic pre-deployed in a smart contract on the tax blockchain to create an invoice for the target payment order.

The blockchain described in the present specification can include any type of blockchain network. For example, in practice, any one of a public blockchain, a private blockchain, or a consortium blockchain can be used.

Transactions in the blockchain are classified into transactions in a narrow sense and transactions in a broad sense. A transaction in a narrow sense refers to a value transfer that is published by a user to the blockchain. For example, in a conventional Bitcoin blockchain network, a transaction can be a funds transfer initiated by a user in the blockchain. A transaction in a broad sense refers to a piece of service data with a service intent that is published by a user to the blockchain. For example, an operator can build a consortium blockchain depending on an actual service demand, and with the help of the consortium blockchain, deploy some other types of online services (such as a rental service, a vehicle scheduling service, an insurance claims service, a credit service, a medical service, etc.) that are unrelated to value transfer. In such consortium blockchain, a transaction can be a service message or service request with a service intent that is published by the user in the consortium blockchain.

In the previous technical solution, when the invoice creation transaction for the target payment order is received, the first collection confirmation transaction whose certificate has been stored in the tax blockchain and the second collection confirmation transaction whose certificate has been stored in the payment blockchain can be identified based on the identifier in the invoice creation transaction. In addition, when the collection confirmation data in the first collection confirmation transaction matches the collection confirmation data in the second collection confirmation transaction, the invoice can be created for the target payment order. As such, because the whole invoice creation process can be completed on the payment blockchain and the tax blockchain that have a cross-chain reference relationship, authenticity and reliability of the invoice can be ensured, and the invoice cannot be tampered with.

FIG. 1 is a schematic diagram illustrating a blockchain-based invoice creation system, according to an example implementation of the present specification.

In the blockchain-based invoice creation system shown in FIG. 1, three-party contract signing can be first performed among a payment institution, a user, and a payment system, and then a three-party contract signing result is published to a payment blockchain for certificate storage where data published to the blockchain is stored in the blockchain, creating an immutable record to be verified later. As such, the user can make payment to the payment institution by using the payment system. For example, the payment institution can be a power supply company, and the user can pay electricity fee to the power supply company by using the payment system.

If the payment institution needs to collect a fee from the user, the payment institution can create a payment order corresponding to the user and publish corresponding order creation data to the payment blockchain for certificate storage. Alternatively, if the user wants to proactively pay a fee to the payment institution, the user can create a payment order by using a client, and the client publishes corresponding order creation data to the payment blockchain for certificate storage. The order creation data can include an order serial number, a payment institution account, a user account, a payment amount, etc.

After obtaining the payment order, the payment system can deduct money from the user account and transfer the deducted amount to the payment institution account. After determining that the payment is completed, on the one hand, the payment system can publish corresponding order payment data to the payment blockchain for certificate storage. The order payment data can include an order serial number, a payment amount, a payment time point, etc. On the other hand, the payment system can issue a collection confirmation notification for the payment order to the payment institution.

After confirming the collection, the payment institution can publish corresponding collection confirmation data separately to the payment blockchain and the tax blockchain for certificate storage. The collection confirmation data can include an order serial number, a collection amount, a collection time point, etc.

In practice, the payment system can publish the collection confirmation notification to the payment blockchain for certificate storage. When detecting the collection confirmation notification whose certificate has been stored in the payment blockchain, the payment institution can perform collection confirmation for the payment order (for example, confirm whether the collection amount is equal to the payment amount; confirm whether write-off processing has been performed on the payment order, and so on), and publish corresponding collection confirmation data separately to the payment blockchain and the tax blockchain for certificate storage.

Later, the user can initiate an invoice creation request for the payment order by using a client provided by an invoice service provider. When receiving the invoice creation request, the node device in the tax blockchain can create an invoice for the payment order and publish the invoice to the tax blockchain for certificate storage. Alternatively, when detecting the previous collection confirmation data whose certificate has been stored in the tax blockchain, the node device in the tax blockchain can create an invoice for the payment order and publish the invoice to the tax blockchain for certificate storage.

In addition, if the user needs to apply for reimbursement of the payment order from a reimbursement institution by using the invoice, the reimbursement institution can perform reimbursement approval for the payment order and publish a reimbursement approval result to the tax blockchain for certificate storage. When detecting the reimbursement approval result whose certificate has been stored in the tax blockchain, and determining that the reimbursement approval result is approved, the payment system can add the previous deducted amount to the user's account and publish reimbursement data to the tax blockchain for certificate storage.

It is worthwhile to note that, in the blockchain-based invoice creation system shown in FIG. 1, there is a cross-chain reference relationship between the tax blockchain and the payment blockchain. For example, after publishing the previous collection confirmation data to the payment blockchain for certificate storage, the payment institution can generate a collection confirmation transaction based on an identifier of the collection confirmation data whose certificate has been stored in the payment blockchain and the collection confirmation data, and publish the collection confirmation transaction to the tax blockchain for certificate storage. As such, when the collection confirmation data in the collection confirmation transaction whose certificate has been stored in the tax blockchain is obtained later, the collection confirmation transaction whose certificate has been stored in the payment blockchain can be further obtained based on the identifier in the collection confirmation transaction.

The payment system and the client can be software systems mounted on a node device in the blockchain, or can be software systems mounted on an electronic device connected to a node device in the blockchain, which is not limited in the present specification.

Figure 2:
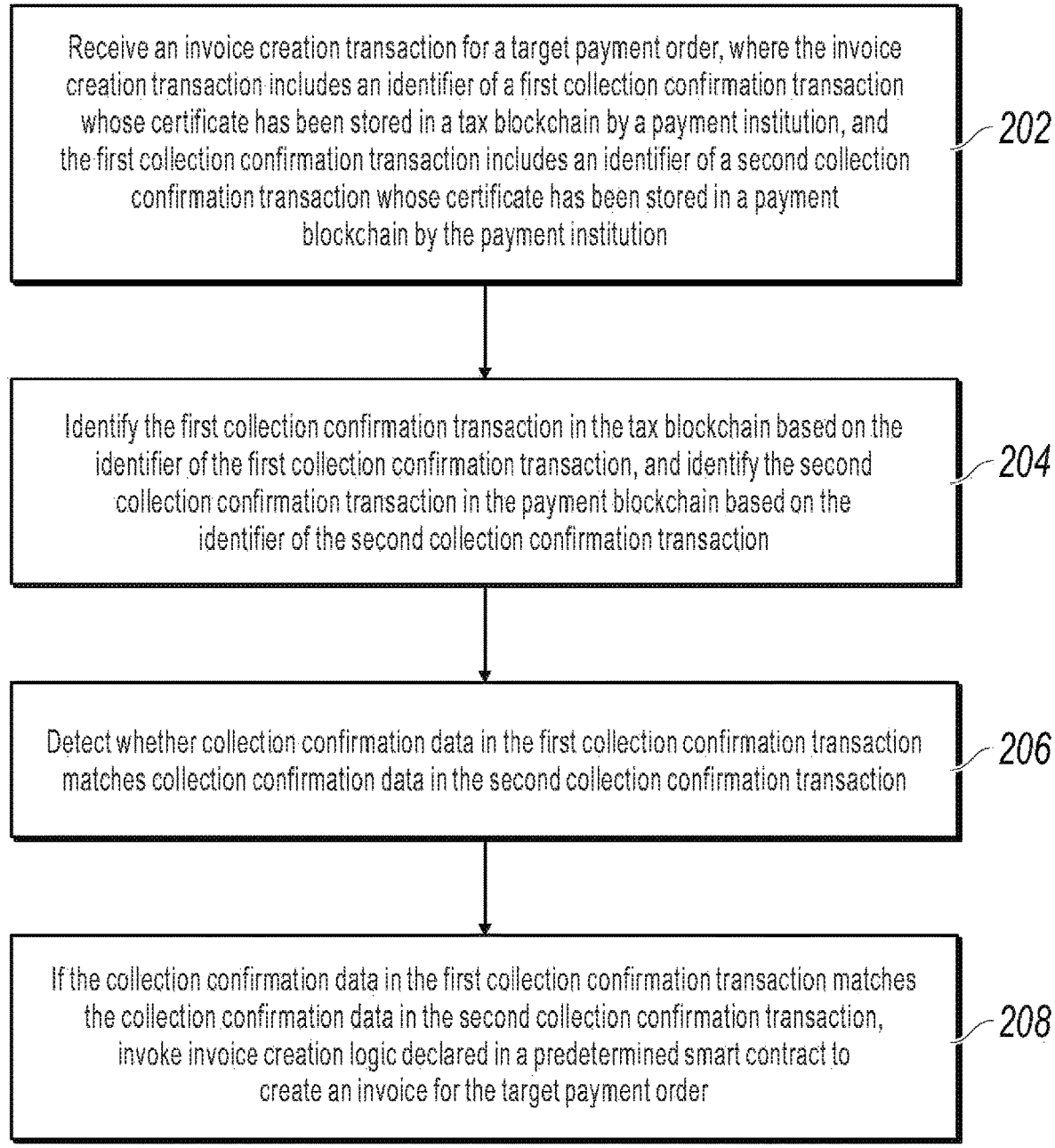
FIG. 2 is a flowchart illustrating a blockchain-based invoice creation method, according to an example implementation of the present specification.

FIG. 2 is a flowchart illustrating a blockchain-based invoice creation method, according to an example implementation of the present specification. The method can be applied to the node device in the tax blockchain shown in FIG. 1, and can include the following steps:

Step 202: Receive an invoice creation transaction for a target payment order, where the invoice creation transaction includes an identifier of a first collection confirmation transaction whose certificate has been stored in a tax blockchain by a payment institution, and the first collection confirmation transaction includes an identifier of a second collection confirmation transaction whose certificate has been stored in a payment blockchain by the payment institution.

Step 204: Identify the first collection confirmation transaction in the tax blockchain based on the identifier of the first collection confirmation transaction, and identify the second collection confirmation transaction in the payment blockchain based on the identifier of the second collection confirmation transaction.

Step 206: Detect whether collection confirmation data in the first collection confirmation transaction matches collection confirmation data in the second collection confirmation transaction.

Step 208: If the collection confirmation data in the first collection confirmation transaction matches the collection confirmation data in the second collection confirmation transaction, invoke invoice creation logic declared in a predetermined smart contract to create an invoice for the target payment order.

In the present implementation, a user can initiate an invoice creation request for a certain payment order (referred to as a target payment order) by using a client provided by an invoice service provider. The client can send the invoice creation request (that is, creating a transaction for the invoice) to the node device in the tax blockchain.

Alternatively, when detecting the first collection confirmation transaction whose certificate has been stored in the tax blockchain by the payment institution, the node device in the tax blockchain can generate an invoice creation transaction based on the identifier of the first collection confirmation transaction.

The invoice creation transaction can include the identifier of the first collection confirmation transaction whose certificate has been stored in the tax blockchain by the payment institution, and the first collection confirmation transaction can include the identifier of the second collection confirmation transaction whose certificate has been stored in the payment blockchain by the payment institution.

In practice, the identifier can be a hash value (referred to as a hash pointer) obtained by performing hash calculation based on the data and a storage address of the data in the blockchain.

For example, the identifier of the first collection confirmation transaction can be a hash pointer obtained by performing hash calculation based on the collection confirmation data in the first collection confirmation transaction and a storage address of the first collection confirmation transaction in the tax blockchain. The identifier of the second collection confirmation transaction can be a hash pointer obtained by performing hash calculation based on the collection confirmation data in the second collection confirmation transaction and a storage address of the second collection confirmation transaction in the payment blockchain.

After receiving the previous invoice creation transaction, the node device in the tax blockchain can identify the first collection confirmation transaction in the tax blockchain based on the identifier (i.e., the identifier of the first collection confirmation transaction) in the invoice creation transaction. After identifying the first collection confirmation transaction, the node device in the tax blockchain can further identify the second collection confirmation transaction in the payment blockchain based on the identifier (i.e., the identifier of the second collection confirmation transaction) in the first collection confirmation transaction.

Later, the node device in the tax blockchain can detect whether the collection confirmation data in the first collection confirmation transaction whose certificate has been stored in the tax blockchain matches the collection confirmation data in the second collection confirmation transaction whose certificate has been stored in the payment blockchain, for example, whether a collection amount in the first collection confirmation transaction is equal to a collection amount in the second collection confirmation transaction, and whether an order serial number in the first collection confirmation transaction is the same as an order serial number in the second collection confirmation transaction.

If the collection confirmation data in the first collection confirmation transaction matches the collection confirmation data in the second collection confirmation transaction, it can be considered that the previous target payment order is authentic and valid, that is, an invoice can be created for the target payment order. In such case, the node device in the tax blockchain can invoke invoice creation logic pre-deployed in a smart contract on the tax blockchain to create an invoice for the target payment order. For example, the node device can create an invoice corresponding to the target payment order based on data such as a payer (i.e., a user account), a payee (i.e., a payment institution account), a collection amount, and a collection time point in the collection confirmation data.

The invoice creation logic can be program code (e.g., some program methods or functions that can be invoked) that is declared in the smart contract and related to execution logic for creating the invoice.

If the collection confirmation data in the first collection confirmation transaction does not match the collection confirmation data in the second collection confirmation transaction, it can be considered that the previous target payment order does not satisfy an invoicing condition at present, and therefore there is no need to create an invoice for the target payment order.

In practice, the smart contract can further declare data matching logic. In such case, the node device in the tax blockchain can invoke the data matching logic in the smart contract to detect whether the collection confirmation data in the first collection confirmation transaction whose certificate has been stored in the tax blockchain matches the collection confirmation data in the second collection confirmation transaction whose certificate has been stored in the payment blockchain.

The data matching logic can be program code that is declared in the smart contract and related to execution logic for data matching.

In a shown implementation, to further ensure the authenticity and validity of the previously described target payment order, after determining that the collection confirmation data in the first collection confirmation transaction matches the collection confirmation data in the second collection confirmation transaction, the node device in the tax blockchain can further identify original order data of the target payment order in the payment blockchain based on the identifier in the second collection confirmation transaction.

References can be made to FIG. 1 again. As shown in FIG. 1, the previous original order data can be published to the payment blockchain for certificate storage in the form of a linked list. The identifier in the second collection confirmation transaction can be an identifier of the last node of the linked list corresponding to the original order data.

The identifier can also be a hash value (referred to as a hash pointer) obtained by performing hash calculation based on the data and a storage address of the data in the blockchain.

In practice, the original order data can include a three-party contract signing result, order creation data, and order payment data.

The payment institution or the client used by the user can generate an order creation transaction based on the previously mentioned order creation data and the hash pointer corresponding to the previously mentioned three-party contract signing result whose certificate has been stored in the payment blockchain (i.e., the hash pointer obtained by performing hash calculation based on the three-party contract signing result and the storage address of the three-party contract signing result in the payment blockchain), and publish the order creation transaction to the payment blockchain for certificate storage.

The payment system can generate an order payment transaction based on the previously mentioned order payment data and the hash pointer corresponding to the order creation transaction (i.e., the hash pointer obtained by performing hash calculation based on the order creation data in the order creation transaction and the storage address of the order creation transaction in the payment blockchain), and publish the order payment transaction to the payment blockchain for certificate storage.

On the one hand, the payment institution can generate a second collection confirmation transaction based on the previously mentioned collection confirmation data and the hash pointer corresponding to the order payment transaction (i.e., the hash pointer obtained by performing hash calculation based on the order payment data in the order payment transaction and the storage address of the order payment transaction in the payment blockchain), and publish the second collection confirmation transaction to the payment blockchain for certificate storage.

On the other hand, the payment institution can generate the first collection confirmation transaction based on the previously mentioned collection confirmation data and the hash pointer corresponding to the second collection confirmation transaction (i.e., the hash pointer obtained by performing hash calculation based on the collection confirmation data in the second collection confirmation transaction and the storage address of the second collection confirmation transaction in the payment blockchain), and publish the first collection confirmation transaction to the tax blockchain for certificate storage.

In the previous case, the last node of the linked list corresponding to the original order data is the order payment transaction, and the identifier of the last node is the identifier of the order payment transaction.

The node device in the tax blockchain can identify the previous order payment transaction in the payment blockchain based on the identifier in the second collection confirmation transaction; after identifying the order payment transaction, can further identify the order creation transaction in the payment blockchain based on the identifier in the order payment transaction; and after identifying the order creation transaction, can further identify the three-party contract signing result in the payment blockchain based on the identifier in the order creation transaction. To be specific, the node device can identify the original order data including the three-party contract signing result, the order creation data, and the order payment data in the payment blockchain based on the identifier in the second collection confirmation transaction.

After identifying the original order data of the previously mentioned target payment order, the node device in the tax blockchain can detect whether the original order data is complete, for example, whether the original order data includes three types of data: the three-party contract signing result, the order creation data, and the order payment data; and whether each type of data is complete, and so on.

If the previous original order data is complete, the node device in the tax blockchain can further invoke the invoice creation logic declared in the smart contract pre-deployed on the tax blockchain to create the invoice for the target payment order.

If the previous original order data is incomplete, no invoice can be created for the target payment order.

When determining that the invoice creation for the previously mentioned target payment order is complete, the node device in the tax blockchain can generate the identifier of the first collection confirmation transaction, for example, perform hash calculation based on the collection confirmation data in the first collection confirmation transaction and the storage address of the first collection confirmation transaction in the tax blockchain, to obtain the hash pointer of the first collection confirmation transaction. Later, the node device can publish invoice data (i.e., the created invoice) and the identifier of the first collection confirmation transaction to the tax blockchain for certificate storage.

In a shown implementation, if the user needs to apply for reimbursement of the payment order from the reimbursement institution by using the invoice, the reimbursement institution can perform reimbursement approval for the payment order by using the client, and send the reimbursement approval result to the node device in the tax blockchain, so that the node device in the tax blockchain publishes the reimbursement approval result and the identifier of the previously mentioned invoice data (e.g., the hash pointer corresponding to the invoice data) to the tax blockchain for certificate storage.

When detecting the reimbursement approval result whose certificate has been stored in the tax blockchain, and determining that the reimbursement approval result is approved, the payment system can add the previous deducted amount to the user's account and send the reimbursement data to the node device in the tax blockchain, so that the node device in the tax blockchain publishes the reimbursement data and the identifier of the previously mentioned reimbursement approval result (e.g., the hash pointer corresponding to the reimbursement approval result) to the tax blockchain for certificate storage.

In a shown implementation, after the refund for the previous target payment order is completed, the node device in the tax blockchain can further create a reverse invoice corresponding to the previous invoice for the target payment order to correct or amend the previous invoice. For example, the node device can create the reverse invoice corresponding to the previous invoice for the target payment order when detecting that first refund data whose certificate has been stored in the tax blockchain by the payment institution matches second refund data whose certificate has been stored in the payment blockchain by the payment institution. For specific steps of creating the reverse invoice by the node device, references can be made to the specific steps of creating the previous invoice. Details are omitted here for simplicity.

In the previous technical solution, when the invoice creation transaction for the target payment order is received, the first collection confirmation transaction whose certificate has been stored in the tax blockchain and the second collection confirmation transaction whose certificate has been stored in the payment blockchain can be identified based on the identifier in the invoice creation transaction. In addition, when the collection confirmation data in the first collection confirmation transaction matches the collection confirmation data in the second collection confirmation transaction, the invoice can be created for the target payment order. As such, because the whole invoice creation process can be completed on the payment blockchain and the tax blockchain that have a cross-chain reference relationship, authenticity and reliability of the invoice can be ensured, and the invoice cannot be tampered with.

Corresponding to the previous implementation of the blockchain-based invoice creation method, the present specification further provides an implementation of a blockchain-based invoice creation apparatus.

Figure 3:
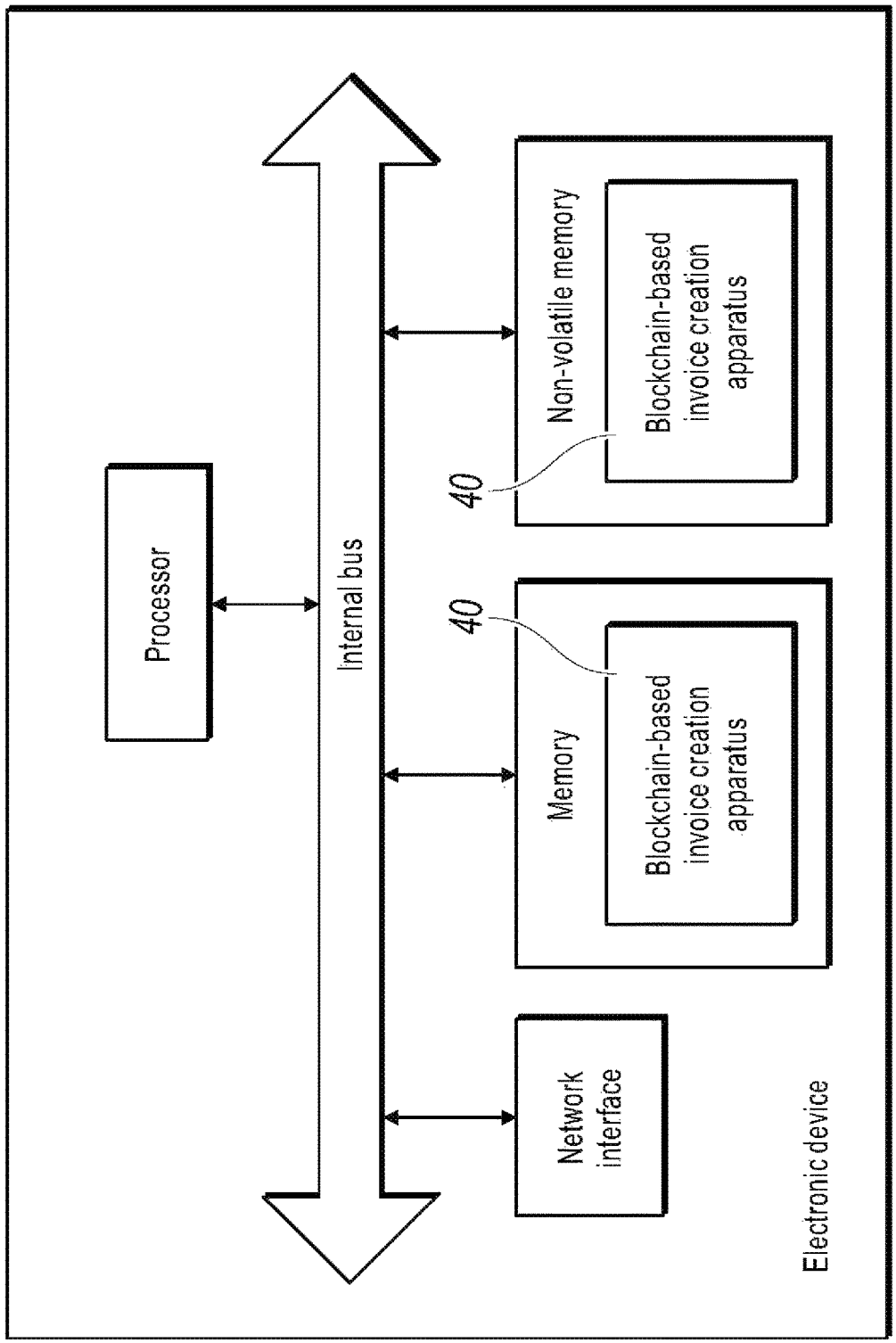
FIG. 3 is a diagram illustrating a hardware structure of an electronic device in which a blockchain-based invoice creation apparatus is located, according to an example implementation of the present specification.

The implementation of the blockchain-based invoice creation apparatus in the present specification can be applied to an electronic device that serves as a node device in a tax blockchain. The apparatus implementation can be implemented by software, or can be implemented by hardware or a combination of software and hardware. For example, the apparatus implementation is implemented by software. A logical apparatus is formed when a processor of an electronic device where the apparatus is located reads a corresponding computer program instruction in a non-volatile memory into the memory for running. In terms of hardware, FIG. 3 is a diagram illustrating a hardware structure of an electronic device in which a blockchain-based invoice creation apparatus is located, according to the present specification. In addition to the processor, memory, network interface, and non-volatile memory shown in FIG. 3, the electronic device in which the apparatus is located in the implementation generally can further include other hardware based on an actual function of blockchain-based invoice creation. Details are omitted here for simplicity.

Figure 4:
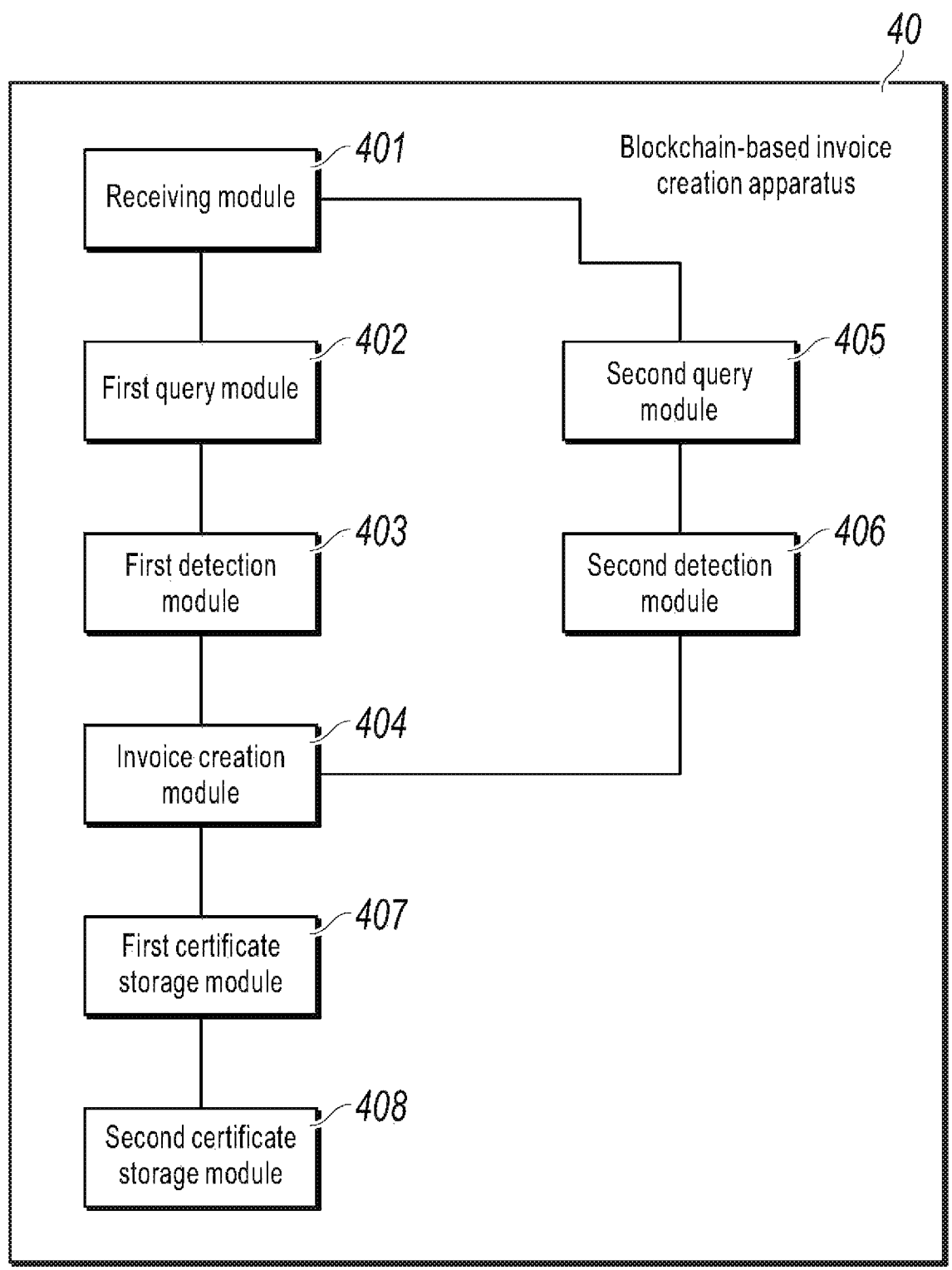
FIG. 4 is a block diagram illustrating a blockchain-based invoice creation apparatus, according to an example implementation of the present specification.

FIG. 4 is a block diagram illustrating a blockchain-based invoice creation apparatus, according to an example implementation of the present specification. The apparatus 40 can be applied to the electronic device shown in FIG. 3. There is a cross-chain reference relationship between the tax blockchain and the payment blockchain. The apparatus 40 can include the following: a receiving module 401, configured to receive an invoice creation transaction for a target payment order, where the invoice creation transaction includes an identifier of a first collection confirmation transaction whose certificate has been stored in the tax blockchain by a payment institution, and the first collection confirmation transaction includes an identifier of a second collection confirmation transaction whose certificate has been stored in the payment blockchain by the payment institution; a first query module 402, configured to identify the first collection confirmation transaction in the tax blockchain based on the identifier of the first collection confirmation transaction, and identify the second collection confirmation transaction in the payment blockchain based on the identifier of the second collection confirmation transaction; a first detection module 403, configured to detect whether collection confirmation data in the first collection confirmation transaction matches collection confirmation data in the second collection confirmation transaction; and an invoice creation module 404, configured to: if the collection confirmation data in the first collection confirmation transaction matches the collection confirmation data in the second collection confirmation transaction, invoke invoice creation logic declared in a predetermined smart contract to create an invoice for the target payment order.

In the present implementation, the receiving module 401 can be configured to: receive an invoice creation request for the target payment order initiated by a user; or generate the invoice creation transaction based on the identifier of the second collection confirmation transaction when the second collection confirmation transaction whose certificate has been stored in the tax blockchain is detected.

In the present implementation, the smart contract further declares data matching logic, and the first detection module 403 can be configured to: invoke the data matching logic declared in the smart contract to detect whether the collection confirmation data in the first collection confirmation transaction matches the collection confirmation data in the second collection confirmation transaction.

In the present implementation, the second collection confirmation transaction includes an identifier of original order data whose certificate has been stored in the payment blockchain and that corresponds to the target payment order.

The apparatus 40 can further include the following: a second query module 405, configured to: before the invoice creation logic declared in the predetermined smart contract is invoked to create the invoice for the target payment order, identify the original order data in the payment blockchain based on the identifier of the original order data; and a second detection module 406, configured to detect whether the original order data is complete.

The invoice creation module 404 can be configured to: if the original order data is complete, further invoke the invoice creation logic declared in the predetermined smart contract to create the invoice for the target payment order.

In the present implementation, the original order data is published to the payment blockchain for certificate storage in the form of a linked list, and the identifier of the original order data is a hash pointer corresponding to the last node of the linked list.

In the present implementation, the original order data includes a three-party contract signing result, order creation data, and order payment data.

The order creation data is linked to the three-party contract signing result by using a hash pointer corresponding to the three-party contract signing result.

The order payment data is linked to the order creation data by using a hash pointer corresponding to the order creation data, and the order payment data is the last node of the one-way linked list.

In the present implementation, the apparatus 40 can further include the following: a first certificate storage module 407, configured to: when it is determined that the creation of the invoice for the target payment order is completed, publish invoice data and the identifier of the first collection confirmation transaction to the tax blockchain for certificate storage.

In the present implementation, the apparatus 40 can further include the following: a second certificate storage module 408, configured to: when a reimbursement approval result from a reimbursement institution is received, publish the reimbursement approval result and an identifier of the invoice data to the tax blockchain for certificate storage.

For an implementation process of functions and roles of each module in the apparatus, references can be made to an implementation process of a corresponding step in the previous method. Details are omitted here for simplicity.

Because an apparatus implementation corresponds to a method implementation, for related parts, references can be made to related descriptions in the method implementation. The described apparatus implementations are only examples. The modules described as separate components may or may not be physically separated. Components displayed as modules may or may be not physical modules, may be located at one position, or may be distributed on multiple network modules. Some or all of the modules can be selected depending on an actual demand to achieve the objectives of the solutions of the present specification. A person of ordinary skill in the art can understand and implement the implementations of the present specification without creative efforts.

The system, apparatus, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous implementation of the blockchain-based invoice creation method, the present specification further provides an implementation of an electronic device. The electronic device includes the following: a processor; and a memory, configured to store a machine executable instruction, where the processor and the memory are usually interconnected by using an internal bus. In other possible implementations, the device can further include an external interface to communicate with other devices or components.

In the present implementation, by reading and executing a machine executable instruction that is stored in the memory and corresponds to control logic of blockchain-based invoice creation, the processor is enabled to perform the following operations: receiving an invoice creation transaction for a target payment order, where the invoice creation transaction includes an identifier of a first collection confirmation transaction whose certificate has been stored in a tax blockchain by a payment institution, and the first collection confirmation transaction includes an identifier of a second collection confirmation transaction whose certificate has been stored in a payment blockchain by the payment institution; identifying the first collection confirmation transaction in the tax blockchain based on the identifier of the first collection confirmation transaction, and identifying the second collection confirmation transaction in the payment blockchain based on the identifier of the second collection confirmation transaction; detecting whether collection confirmation data in the first collection confirmation transaction matches collection confirmation data in the second collection confirmation transaction; and if the collection confirmation data in the first collection confirmation transaction matches the collection confirmation data in the second collection confirmation transaction, invoking invoice creation logic declared in a predetermined smart contract to create an invoice for the target payment order, where there is a cross-chain reference relationship between the tax blockchain and the payment blockchain.

In the present implementation, the receiving an invoice creation transaction for a target payment order includes the following: receiving an invoice creation request for the target payment order initiated by a user; or generating the invoice creation transaction based on the identifier of the second collection confirmation transaction when the second collection confirmation transaction whose certificate has been stored in the tax blockchain is detected.

In the present implementation, the smart contract further declares data matching logic, and the detecting whether collection confirmation data in the first collection confirmation transaction matches collection confirmation data in the second collection confirmation transaction includes the following: invoking the data matching logic declared in the smart contract to detect whether the collection confirmation data in the first collection confirmation transaction matches the collection confirmation data in the second collection confirmation transaction.

In the present implementation, the second collection confirmation transaction includes an identifier of original order data whose certificate has been stored in the payment blockchain and that corresponds to the target payment order.

Before the invoking invoice creation logic declared in a predetermined smart contract to create an invoice for the target payment order, the method further includes the following: identifying the original order data in the payment blockchain based on the identifier of the original order data; detecting whether the original order data is complete; and if the original order data is complete, further invoking the invoice creation logic declared in the predetermined smart contract to create the invoice for the target payment order.

In the present implementation, the original order data is published to the payment blockchain for certificate storage in the form of a linked list, and the identifier of the original order data is a hash pointer corresponding to the last node of the linked list.

In the present implementation, the original order data includes a three-party contract signing result, order creation data, and order payment data.

The order creation data is linked to the three-party contract signing result by using a hash pointer corresponding to the three-party contract signing result.

The order payment data is linked to the order creation data by using a hash pointer corresponding to the order creation data, and the order payment data is the last node of the one-way linked list.

In the present implementation, the method further includes the following: when it is determined that the creation of the invoice for the target payment order is completed, publishing invoice data and the identifier of the first collection confirmation transaction to the tax blockchain for certificate storage.

In the present implementation, the method further includes the following: when a reimbursement approval result from a reimbursement institution is received, publishing the reimbursement approval result and an identifier of the invoice data to the tax blockchain for certificate storage.

A person skilled in the art can easily figure out another implementation of the present specification after thinking over the specification and practicing the present disclosure here. The present specification is intended to cover any variations, uses, or adaptations of the present specification, and these variations, uses, or adaptations follow the general principles of the present specification and include common knowledge or conventional techniques that are not disclosed in the technical field of the present specification. The specification and the implementations are merely considered as examples, and the actual scope and the spirit of the present specification are pointed out by the following claims.

It should be understood that the present specification is not limited to the precise structures that have been described previously and shown in the drawings, and various modifications and changes can be made without departing from the scope of the present specification. The scope of the present specification is limited by the appended claims only.

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for creating blockchain-based invoices, comprising:
   receiving, by a node device in a tax blockchain, an invoice creation transaction for a target payment order, wherein the tax blockchain is maintained by the node device in the tax blockchain, wherein the tax blockchain corresponds with a payment blockchain associated with a payment institution, and wherein there is a cross-chain reference relationship between the tax blockchain and the payment blockchain, the invoice creation transaction comprises an identifier of a first collection confirmation transaction whose certificate has been stored in the tax blockchain by the payment institution, and the first collection confirmation transaction comprises an identifier of a second collection confirmation transaction whose certificate has been stored in the payment blockchain by the payment institution;
   identifying, by the node device in the tax blockchain, the first collection confirmation transaction in the tax blockchain based on the identifier of the first collection confirmation transaction;
   identifying, by the node device in the tax blockchain, the second collection confirmation transaction in the payment blockchain based on the identifier of the second collection confirmation transaction;
   detecting, by the node device in the tax blockchain and using data matching logic declared in a smart contract, whether collection confirmation data in the first collection confirmation transaction matches collection confirmation data in the second collection confirmation transaction; and
   in response to detecting that the collection confirmation data in the first collection confirmation transaction matches the collection confirmation data in the second collection confirmation transaction,
      creating, by the node device in the tax blockchain, an invoice for the target payment order, by invoking invoice creation logic declared in the smart contract.

2. The computer-implemented method according to claim 1, wherein the receiving an invoice creation transaction for a target payment order comprises:
   receiving an invoice creation request for a target payment order initiated by a user; or
   generating the invoice creation transaction based on the identifier of the second collection confirmation transaction in response to detecting the second collection confirmation transaction whose certificate has been stored in the tax blockchain.

3. The computer-implemented method according to claim 1, further comprising:
   deploying the smart contract on the tax blockchain; and
   declaring the data matching logic and the invoice creation logic by the smart contract.

4. The computer-implemented method according to claim 1, wherein the second collection confirmation transaction comprises an identifier of original order data whose certificate has been stored in the payment blockchain and that corresponds to the target payment order; and before invoking the invoice creation logic declared in the smart contract to create an invoice for the target payment order, the computer-implemented method further comprises:
identifying the original order data in the payment blockchain based on the identifier of the original order data;
detecting whether the original order data is complete; and
in response to detecting that the original order data is complete, further invoking the invoice creation logic declared in the smart contract to create the invoice for the target payment order.

5. The computer-implemented method according to claim 4, wherein the original order data is published to the payment blockchain for storage in a form of a linked list, and the identifier of the original order data is a hash pointer corresponding to a last node of the linked list.

6. The computer-implemented method according to claim 5, wherein the original order data comprises a three-party contract signing result, order creation data, and order payment data, wherein:
the order creation data is linked to the three-party contract signing result by using a hash pointer corresponding to the three-party contract signing result; and
the order payment data is linked to the order creation data by using a hash pointer corresponding to the order creation data, and the order payment data is a last node of a one-way linked list.

7. The computer-implemented method according to claim 1, further comprising:
in response to detecting that creation of the invoice for the target payment order is completed, publishing invoice data and the identifier of the first collection confirmation transaction to the tax blockchain for storage.

8. The computer-implemented method according to claim 7, further comprising:
in response to receiving a reimbursement approval result from a reimbursement institution, publishing the reimbursement approval result and an identifier of the invoice data to the tax blockchain for storage.

9. A non-transitory, computer-readable medium storing one or more instructions executable by a computer system to perform one or more operations for creating blockchain-based invoices, comprising:
receiving, by a node device in a tax blockchain, an invoice creation transaction for a target payment order, wherein the tax blockchain is maintained by the node device in the tax blockchain, wherein the tax blockchain corresponds with a payment blockchain associated with a payment institution, and wherein there is a cross-chain reference relationship between the tax blockchain and the payment blockchain, the invoice creation transaction comprises an identifier of a first collection confirmation transaction whose certificate has been stored in the tax blockchain by the payment institution, and the first collection confirmation transaction comprises an identifier of a second collection confirmation transaction whose certificate has been stored in the payment blockchain by the payment institution;
identifying, by the node device in the tax blockchain, the first collection confirmation transaction in the tax blockchain based on the identifier of the first collection confirmation transaction;
identifying, by the node device in the tax blockchain, the second collection confirmation transaction in the payment blockchain based on the identifier of the second collection confirmation transaction;
detecting, by the node device in the tax blockchain and using data matching logic declared in a smart contract, whether collection confirmation data in the first collection confirmation transaction matches collection confirmation data in the second collection confirmation transaction; and
in response to detecting that the collection confirmation data in the first collection confirmation transaction matches the collection confirmation data in the second collection confirmation transaction,
creating, by the node device in the tax blockchain, an invoice for the target payment order, by invoking invoice creation logic declared in the smart contract.

10. The non-transitory, computer-readable medium according to claim 9, wherein the receiving an invoice creation transaction for a target payment order comprises:
receiving an invoice creation request for a target payment order initiated by a user; or
generating the invoice creation transaction based on the identifier of the second collection confirmation transaction in response to detecting the second collection confirmation transaction whose certificate has been stored in the tax blockchain.

11. The non-transitory, computer-readable medium according to claim 9, further comprising:
deploying the smart contract on the tax blockchain; and
declaring the data matching logic and the invoice creation logic by the smart contract.

12. The non-transitory, computer-readable medium according to claim 9, wherein the second collection confirmation transaction comprises an identifier of original order data whose certificate has been stored in the payment blockchain and that corresponds to the target payment order; and
before invoking the invoice creation logic declared in the smart contract to create an invoice for the target payment order, the one or more operations further comprising:
identifying the original order data in the payment blockchain based on the identifier of the original order data;
detecting whether the original order data is complete; and
in response to detecting that the original order data is complete, further invoking the invoice creation logic declared in the smart contract to create the invoice for the target payment order.

13. The non-transitory, computer-readable medium according to claim 12, wherein the original order data is published to the payment blockchain for storage in a form of a linked list, and the identifier of the original order data is a hash pointer corresponding to a last node of the linked list.

14. The non-transitory, computer-readable medium according to claim 13, wherein the original order data comprises a three-party contract signing result, order creation data, and order payment data, wherein:
the order creation data is linked to the three-party contract signing result by using a hash pointer corresponding to the three-party contract signing result; and
the order payment data is linked to the order creation data by using a hash pointer corresponding to the order creation data, and the order payment data is a last node of a one-way linked list.

15. The non-transitory, computer-readable medium according to claim 9, wherein the one or more operations further comprising:
in response to detecting that creation of the invoice for the target payment order is completed, publishing invoice data and the identifier of the first collection confirmation transaction to the tax blockchain for storage; and in response to receiving a reimbursement approval result from a reimbursement institution, publishing the reimbursement approval result and an identifier of the invoice data to the tax blockchain for storage.

16. A computer-implemented system for creating blockchain-based invoices, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a node device in a tax blockchain, an invoice creation transaction for a target payment order, wherein the tax blockchain is maintained by the node device in the tax blockchain, wherein the tax blockchain corresponds with a payment blockchain associated with a payment institution, and wherein there is a cross-chain reference relationship between the tax blockchain and the payment blockchain, the invoice creation transaction comprises an identifier of a first collection confirmation transaction whose certificate has been stored in the tax blockchain by the payment institution, and the first collection confirmation transaction comprises an identifier of a second collection confirmation transaction whose certificate has been stored in the payment blockchain by the payment institution;

identifying, by the node device in the tax blockchain, the first collection confirmation transaction in the tax blockchain based on the identifier of the first collection confirmation transaction;

identifying, by the node device in the tax blockchain, the second collection confirmation transaction in the payment blockchain based on the identifier of the second collection confirmation transaction;

detecting, by the node device in the tax blockchain and using data matching logic declared in a smart contract, whether collection confirmation data in the first collection confirmation transaction matches collection confirmation data in the second collection confirmation transaction; and in response to detecting that the collection confirmation data in the first collection confirmation transaction matches the collection confirmation data in the second collection confirmation transaction, creating, by the node device in the tax blockchain, an invoice for the target payment order, by invoking invoice creation logic declared in the smart contract.

17. The computer-implemented system according to claim 16, wherein the receiving an invoice creation transaction for a target payment order comprises:

receiving an invoice creation request for a target payment order initiated by a user; or generating the invoice creation transaction based on the identifier of the second collection confirmation transaction in response to detecting the second collection confirmation transaction whose certificate has been stored in the tax blockchain.

18. The computer-implemented system according to claim 16, further comprising:

deploying the smart contract on the tax blockchain; and declaring the data matching logic and the invoice creation logic by the smart contract.

19. The computer-implemented system according to claim 16, wherein the second collection confirmation transaction comprises an identifier of original order data whose certificate has been stored in the payment blockchain and that corresponds to the target payment order; and before invoking the invoice creation logic declared in the smart contract to create an invoice for the target payment order, the one or more operations further comprising:

identifying the original order data in the payment blockchain based on the identifier of the original order data;

detecting whether the original order data is complete; and in response to detecting that the original order data is complete, further invoking the invoice creation logic declared in the smart contract to create the invoice for the target payment order.

20. The computer-implemented system according to claim 19, wherein the original order data is published to the payment blockchain for storage in a form of a linked list, and the identifier of the original order data is a hash pointer corresponding to a last node of the linked list.

* * * * *